UNITED STATES PATENT OFFICE.

BRUNO TERNE, OF PHILADELPHIA, PENNSYLVANIA, ASSIGNOR OF THREE-FOURTHS OF HIS RIGHT TO JOHN P. BAUGH, EDWIN P. BAUGH, AND DANIEL BAUGH, OF SAME PLACE.

TREATMENT OF SEWERAGE.

SPECIFICATION forming part of Letters Patent No. 228,955, dated June 15, 1880.

Application filed April 30, 1879.

*To all whom it may concern:*

Be it known that I, BRUNO TERNE, of Philadelphia, Pennsylvania, have invented a new and useful Improvement in Treating Sewerage and Tank-Waters, and in solutions therefor, of which the following is a specification.

The object of my invention is to utilize and at the same time disinfect the tank-waters of slaughter-houses, bone-boiling and other analogous establishments, as well as sewer-water, by introducing into the same solution of superphosphate of lime and a solution containing tannic or gallic acid, so as to obtain as a precipitate a valuable manure ingredient, and at the same time render the water innocuous.

The superphosphate of which I make a solution may be obtained by the usual sulphuric-acid treatment from any mineral phosphate, bone, ashes, or refuse bone-black, providing it be free from organic matter. The solution of tannic or gallic acid may be obtained from any kind of tan-bark or other tanning substances.

The two solutions may be used separately, the superphosphate solution being introduced into the water first, so that it will be in the best condition for the action of the tannic-acid solution.

The most economical plan, however, is to introduce a mixture of the two solutions into the tank or sewer water, when a precipitate of all nitrogenous organic matter will be obtained, and this precipitate is a valuable fertilizer. At the same time the tank or sewer water will be so purified that when separated from the precipitate it will not be liable to that foul fermentation which is so injurious to health.

The precipitate should be separated from the water by filtration, any of the ordinary filtering apparatus or filtering-presses being used for the purpose, and the precipitate, after filtration, may be dried or partly dried and used as a manure or manure ingredient.

The tank-waters of slaughter-houses and bone-boiling establishments and sewer-waters vary so much in character and in the proportions of organic matter which they contain that it would be impossible to give definite formulas for the preparation of the above solution, the only plan to adopt being to determine by analysis the character of tank or sewer water admitted to any suitable reservoir, and then to so prepare the two solutions above mentioned that the desired precipitation and disinfecting will be produced by introducing the solutions into the water.

In many slaughter-houses or bone-boiling establishments the character of the tank or sewerage water is at all times so nearly the same that after one analysis of the water and one satisfactory test of the solutions on the same these solutions can be properly prepared, ready for use, without tests on waste-waters derived from the same source. I may state as an example that for one hundred and five liters of sewer-water of the Union stock-yards of Chicago I have used six liters of a solution of superphosphate of lime at 15° to 20° Baumé and three liters of tan-bark extract at about 2° to 3° Baumé.

The proportion of the combined solutions to the quantity of waste-waters or tank-liquors will vary somewhat, according to the nature of the waters to be treated.

I claim as my invention—

1. As an improvement in the art of treating sewerage and tank waters for disinfection and precipitation, subjecting said sewerage or tank-waters to the action of a solution of superphosphate of lime and a solution containing gallic or tannic acid, said solutions being applied separately or together, as set forth.

2. The within-described solution for disinfecting and precipitating tank and sewage waters, said solution consisting of water containing superphosphate and tannic or gallic acid in about the proportions set forth.

In testimony whereof I have signed my name to this specification in the presence of two subscribing witnesses.

BRUNO TERNE.

Witnesses:
 WILLIAM J. COOPER,
 HARRY SMITH.